Figure 1:
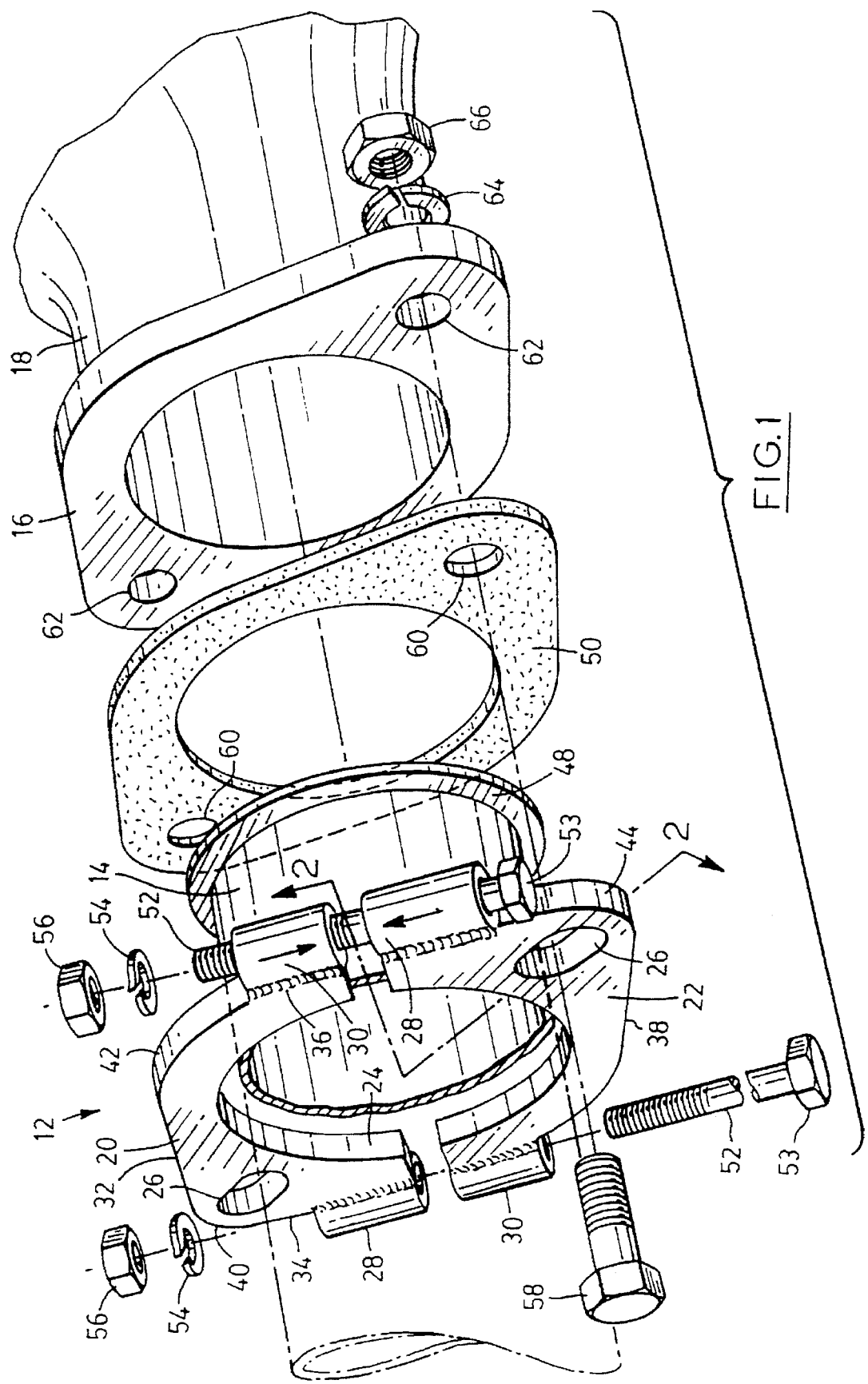

United States Patent [19]

Harth

[11] Patent Number: 5,641,185

[45] Date of Patent: Jun. 24, 1997

[54] ANNULAR CLAMPING FLANGES

[76] Inventor: George C. Harth, 188 Water St. N., Cambridge, Ontario, Canada, N1R 3B6

[21] Appl. No.: 494,748

[22] Filed: Jun. 26, 1995

[51] Int. Cl.$^6$ .................................................. F16L 23/04
[52] U.S. Cl. .......................... 285/187; 285/368; 285/367; 285/373; 285/412; 24/284
[58] Field of Search .............................. 24/284; 285/412, 285/406, 415, 414, 363, 373, 364, 365, 367, 368, 419, 405, 187, 332.2, 302

[56] References Cited

U.S. PATENT DOCUMENTS

| 2,292,845 | 8/1942 | Pratt .................................... 285/363 X |
| 4,981,311 | 1/1991 | Kinney ..................................... 285/302 |
| 5,209,524 | 5/1993 | Corwon et al. ...................... 285/368 X |
| 5,228,726 | 7/1993 | Brown et al. ........................... 285/187 |

*Primary Examiner*—Terry Lee Melius
*Assistant Examiner*—Heather Shackelford
*Attorney, Agent, or Firm*—Rogers & Scott

[57] ABSTRACT

An annular clamping flange for use in clamping a first pipe end portion to a second pipe end portion in an engine exhaust system, has first and second arcuate flange portions co-operable to form a pipe receiving aperture, each flange portion having at least one clamping bolt receiving aperture with a longitudinal axis parallel to the longitudinal axis of the pipe receiving aperture. The annular flange having an outer periphery of generally parallelogram shape with a pair of opposed acute angles and a pair of opposed obtuse angles, the parallelogram shape having rounded corners, one flange portion providing one side and portions of sides of the parallelogram shape adjacent thereto, and the other flange portion providing the opposite side to said one side and the other portions of said adjacent sides, each flange portion having a connecting bolt receiving tubular lug on each said adjacent side portion thereof.

11 Claims, 3 Drawing Sheets

ANNULAR CLAMPING FLANGES

This invention relates to annular clamping flanges for use in clamping a first pipe end portion to a second pipe end portion in an engine exhaust system, for example an exhaust system for a motor vehicle.

When one or more parts of an engine exhaust system have to be replaced, problems often arise when a pipe end portion of a new part has to be clamped to the pipe end portion of an existing part, especially if the existing part has been damaged by long time use or for other reasons.

My earlier U.S. patent application No. 08/419,570 filed Apr. 10, 1995, the contents of which are hereby incorporated herein by reference, describes and claims suitable annular clamping flanges for this purpose. However, there is still a need for annular clamping flanges which are especially useful where installation space is limited.

According to the invention, an annular clamping flange comprises a first arcuate flange portion and a second arcuate flange portion co-operable therewith to form a pipe receiving aperture, each flange portion having at least one clamping bolt receiving aperture with a longitudinal axis parallel to the longitudinal axis of the pipe receiving aperture, said annular flange having an outer periphery of generally parallelogram shape with a pair of opposed acute angles and a pair of opposed obtuse angles, said parallelogram shape having rounded corners, one flange portion providing one side and portions of sides of the parallelogram shape adjacent thereto, and the other flange portion providing the opposite side to said one side and the other portions of said adjacent sides, each flange portion having a connecting bolt receiving tubular lug on each said adjacent side portion thereof, whereby the two flange portions can be positioned around a first pipe end portion and connected together by connecting bolts passing through respective pairs of adjacent tubular lugs on the first and second flange portions, and the annular flange can then be secured to a second pipe end portion by clamping bolts passing around the clamping bolt receiving apertures.

The first flange portion may be identical to the second flange portion. One pair of adjacent tubular lugs may have a longitudinal axis parallel to the longitudinal axis of the other pair of adjacent tubular lugs, and each flange portion may have a single clamping bolt receiving aperture. The tubular lugs may be welded to the flange portions.

The invention also provides an engine exhaust system comprising a first pipe end portion clamped to a second pipe end portion by a clamp including an annular clamping flange as defined above. Advantageously, the connecting bolts have flat sided heads which engage the respective flange portion so as to be prevented from rotation.

Figure 2:
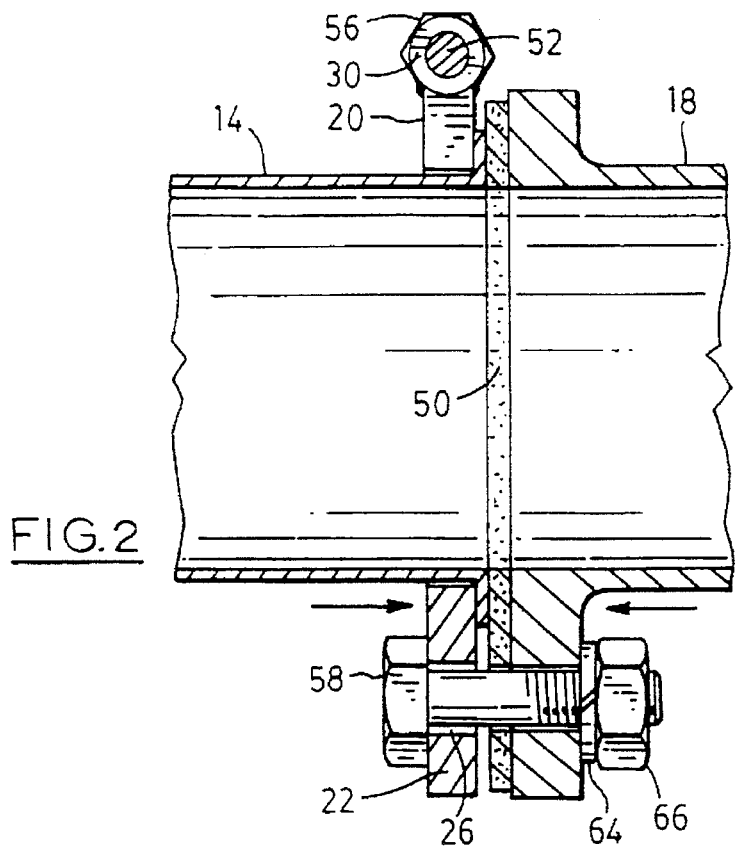
Figure 3:
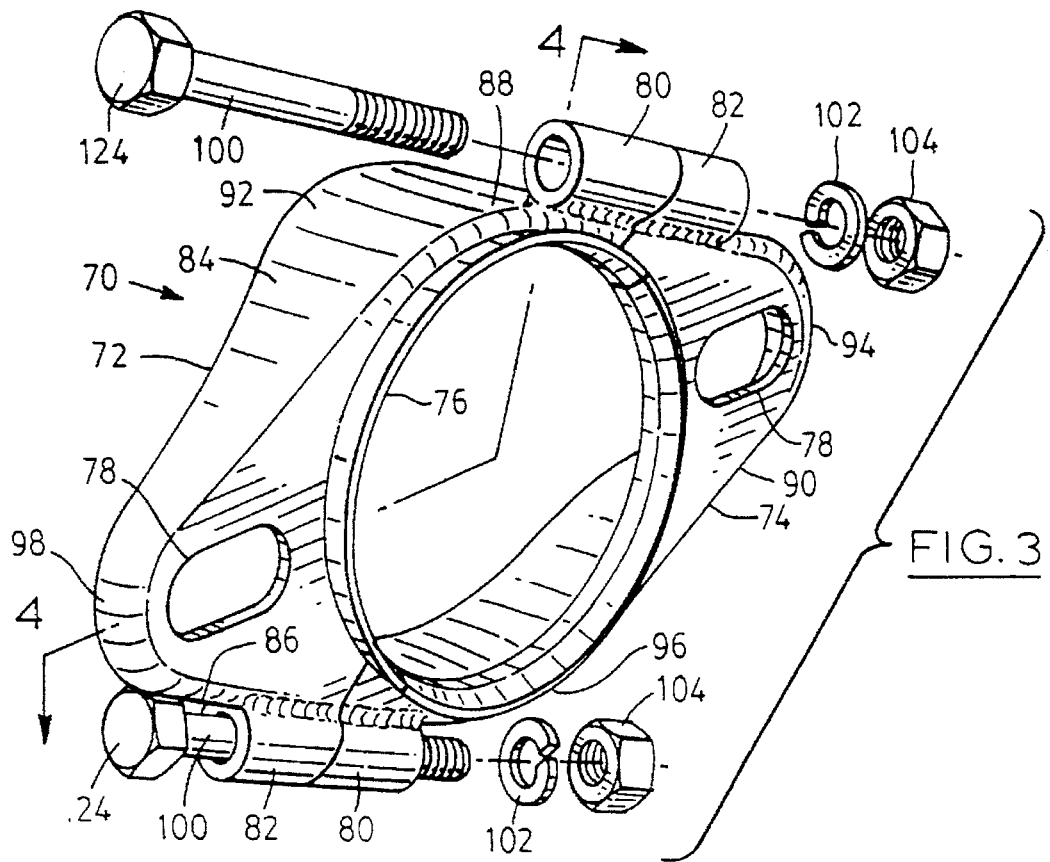
Figure 4:
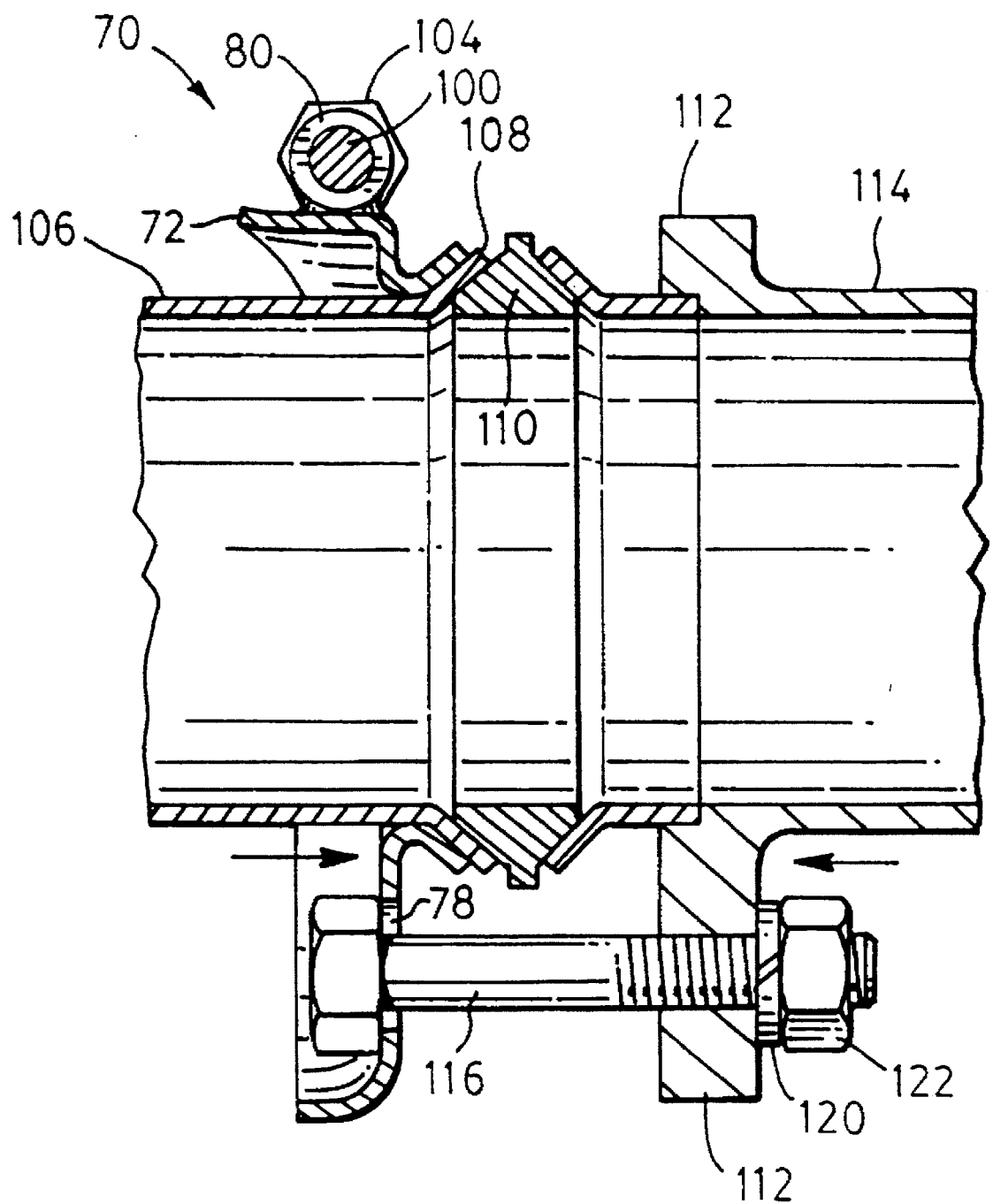

Embodiments of the invention will now be described, by way of example, with reference to the accompanying drawings, in which;

FIG. 1 is an exploded perspective view of an engine exhaust system having two pipe end portions clamped together by a clamp including an annular clamping flange in accordance with one embodiment of the invention, the front of the annular clamping flange being shown, FIG. 2 is a sectional view along the line 2—2 of FIG. 1 but showing the two pipe end portions clamped together, FIG. 3 is a perspective rear view of an annular clamping flange in accordance with another embodiment of the invention, and FIG. 4 is a sectional view along the line 4—4 of FIG. 3 but also showing two pipe end portions clamped together.

Referring to the drawings, FIGS. 1 and 2 show an annular flat clamping flange 12 in accordance with one embodiment of the invention fitted on a first pipe end portion 14 and secured to a clamping flange 16 on a second pipe end portion 18 of a motor vehicle engine exhaust system to clamp the two pipe end portions 14, 18 together. In this embodiment, the first pipe end portion 14 is an existing part extending rearwardly from an engine (not shown) and the second pipe end portion 18 extends forwardly from a new catalytic converter or muffler which is to be attached to the first pipe end portion 14.

The annular clamping flange 12 comprises identical first and second arcuate flat flange portions 20, 22 co-operable with one another to form a pipe receiving aperture 24 to receive the pipe end portion 14. Each flange portion 20, 22 has a single clamping bolt receiving aperture 26 and two connecting bolt receiving tubular lugs 28, 30. The tubular lugs 20, 30 are welded to opposite ends of the respective flange portions 20, 22.

The annular flange 12 has an outer periphery of generally parallelogram shape. One flange portion 20 provides one side 32 and portions of sides 34, 36 of the parallelogram shape adjacent thereto, and the other flange portion 22 provides the opposite side 38 and the other portions of the sides 34, 36. The outer periphery of generally parallelogram shape has a pair of opposed acute angles, namely between the sides 32, 34 and between the sides 36, 38, and a pair of opposed obtuse angles, namely between the sides 32, 36 and between the sides 34, 36. The parallelogram shape has rounded corners 40, 42, 44, 46.

The end of the pipe end portion 14 has a flange 48 formed thereon which mates with one side of a gasket 50, and a flange 16 on the end of pipe end portion 18 mates with the other side of gasket 50 in known manner.

In use, the two clamping flange portions 20, 22 are positioned around the pipe end portion 14, as indicated in FIG. 1, and are connected together by connecting bolts 52 passing through respective pairs of adjacent tubular lugs 28, 30 respectively on the first and second flange portions 20, 22, the bolts 52 having washers 54 and nuts 56. The assembled clamping flange 12 is a loose fit on the pipe end portion 14.

After the gasket 50 has been placed in position, the annular clamping flange 12 is secured to the clamping flange 16 by clamping bolts 58 (only one of which is shown) which pass through the clamping bolt receiving apertures 26 in the flange portions 20, 22 through apertures 60 in the gasket 50 and through clamping bolt receiving apertures 62 in the clamping flange 16 to draw the flanges 48, 16 tightly into engagement with the gasket 50, the clamping bolts 58 having washers 64 and nuts 66.

The person skilled in the art will appreciate that the parallelogram-like configuration of the annular clamping flange facilitates installation in locations with limited space. Also, when the connecting bolts 52 have multi-sided heads 53 as they usually will, the arrangement may be such that a side of the bolt head 53 engages the respective parallelogram side 34, 36 so that the bolt 52 cannot rotate relative to the lugs 28, 30. Thus, it is not necessary to use a wrench to prevent the bolts 52 from rotating when the nuts 56 are being tightened. This feature further facilitates installation in limited space.

FIG. 3 shows an annular formed clamping flange 70 in accordance with another embodiment of the invention comprising identical first and second formed annular portions 72, 74 co-operable with one another to form a pipe receiving aperture 76. Each flange portion 72, 74 has a single clamping bolt receiving aperture 78 and two connecting bolt receiving tubular lugs 80, 82. The tubular lugs 80, 82 are welded to opposite ends of the respective flange portions 72, 74.

The annular flange 70 has an outer periphery of generally parallelogram shape. One flange portion 72 provides one side 84 and portions of sides 86, 88 of the parallelogram shape adjacent thereto, and the other flange portion 74 provides the opposite side 90 and the other portions of the side 86, 88. The outer periphery of the generally parallelogram shape has a pair of opposed acute angles, namely between the sides 84, 86 and between the sides 88, 90, and a pair of opposed obtuse angles, namely between the sides 84, 88 and between the sides 86, 90. The parallelogram shape has rounded corners 92, 94, 96, 98.

In this embodiment, the two clamping flange portions 72, 74 are positioned around a pipe end portion 106, which has a flange 108, and are connected together by connecting bolts 100 passing through respective pairs of adjacent tubular lugs 80, 82 respectively, the bolts 100 having washers 102 and nuts 104. The annular clamping flange 70 is a loose fit on the pipe end portion 14. After a sealing ring 110 has been placed in position, the annular clamping flange 70 is secured to a clamping flange 112 on a second pipe end portion 114 by clamping bolts 116 (only one of which is shown) which pass through the clamping bolt securing aperture 78 in the flange portions 72, 74 and through clamping bolt receiving apertures 118 in the clamping flange 112 to draw the flanges 108, 112 tightly into engagement with the sealing ring 110, the clamping bolts 116 having washers 120 and nuts 122.

The advantages of this embodiment are similar to those described with respect to the previous embodiment. As before, flat sided heads 124 of bolts 100 may engage respective sides 86, 88 of the parallelogram shape to prevent the bolts 100 from rotating when the nuts 122 are being tightened.

Other embodiments of the invention will also be readily apparent to a person skilled in the art, the scope of the invention being defined in the appended claims.

I claim:

1. An annular clamping flange for use in clamping a first pipe end portion to a second pipe end portion in an engine exhaust system, said annular flange comprising:

a first arcuate flange portion and a second arcuate flange portion co-operable therewith to form a pipe receiving aperture, each flange portion having at least one clamping bolt receiving aperture with a longitudinal axis parallel to the longitudinal axis of the pipe receiving aperture, said annular flange having an outer periphery of generally parallelogram shape with a pair of opposed acute angles and a pair of opposed obtuse angles, said parallelogram shape having rounded corners, one flange portion providing one side and portions of sides of the parallelogram shape adjacent thereto, and the other flange portion providing the opposite side to said one side and the other portions of said adjacent sides, each flange portion having a connecting bolt receiving tubular lug on each said adjacent side portion thereof, whereby the two flange portions can be positioned around a first pipe end portion and connected together by connecting bolts passing through respective pairs of adjacent tubular lugs on the first and second flange portions, and the annular flange can then be secured to a second pipe end portion by clamping bolts passing around the clamping bolt receiving apertures.

2. An annular clamping flange according to claim 1 wherein the first flange portion is identical to the second flange portion.

3. An annular clamping flange according to claim 2 wherein one pair of adjacent tubular lugs has a longitudinal axis parallel to the longitudinal axis of the other pair of adjacent tubular lugs.

4. An annular clamping flange according to claim 3 wherein each flange portion has a single clamping bolt receiving aperture.

5. An annular clamping flange according to claim 1 wherein the tubular lugs are welded to the flange portions.

6. An engine exhaust system comprising a first pipe end portion clamped to a second pipe end portion by a clamp including an annular clamping flange as claimed in claim 1, the flange portions of the annular clamping flange being connected around the first pipe end portion by connecting bolts passing through respective pairs of adjacent tubular lugs on the first and second flange portions, the second pipe end portion having a further clamping flange with connecting bolt receiving apertures, and the annular clamping flange being secured to the further clamping flange by clamping bolts passing through the clamping bolt receiving apertures of the annular clamping flange and the further clamping flange.

7. An engine exhaust system according to claim 6 wherein the first flange portion of the annular clamping flange is identical to the second flange portion thereof.

8. An engine exhaust system according to claim 7 wherein one pair of adjacent tubular lugs of the annular clamping flange has a longitudinal axis parallel to the longitudinal axis of the other pair of adjacent tubular lugs thereof.

9. An engine exhaust system according to claim 8 wherein each flange portion of the annular clamping flange has a single clamping bolt receiving aperture.

10. An engine exhaust system according to claim 6 wherein the tubular lugs of the annular clamping flange are welded to the flange portions.

11. An engine exhaust system according to claim 6 wherein the connecting bolts have flat sided heads which engage the respective flange portion so as to be prevented from rotation.

* * * * *